Dec. 31, 1929.  L. L. GILLESPIE  1,741,929
EGG HANDLING APPARATUS
Filed Dec. 29, 1927  5 Sheets-Sheet 2
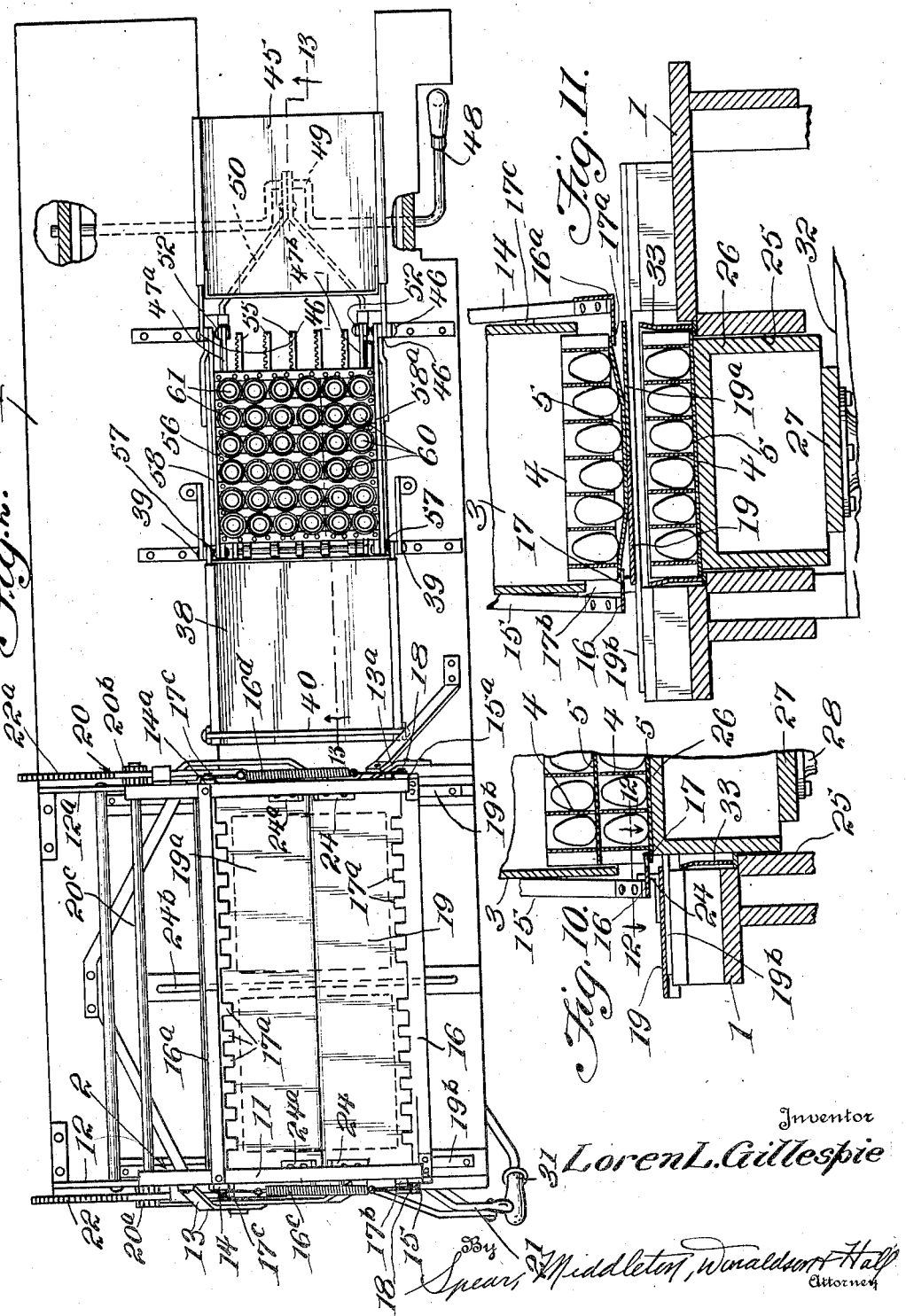
Inventor
Loren L. Gillespie
By Spear, Middleton, Donaldson & Hall
Attorney

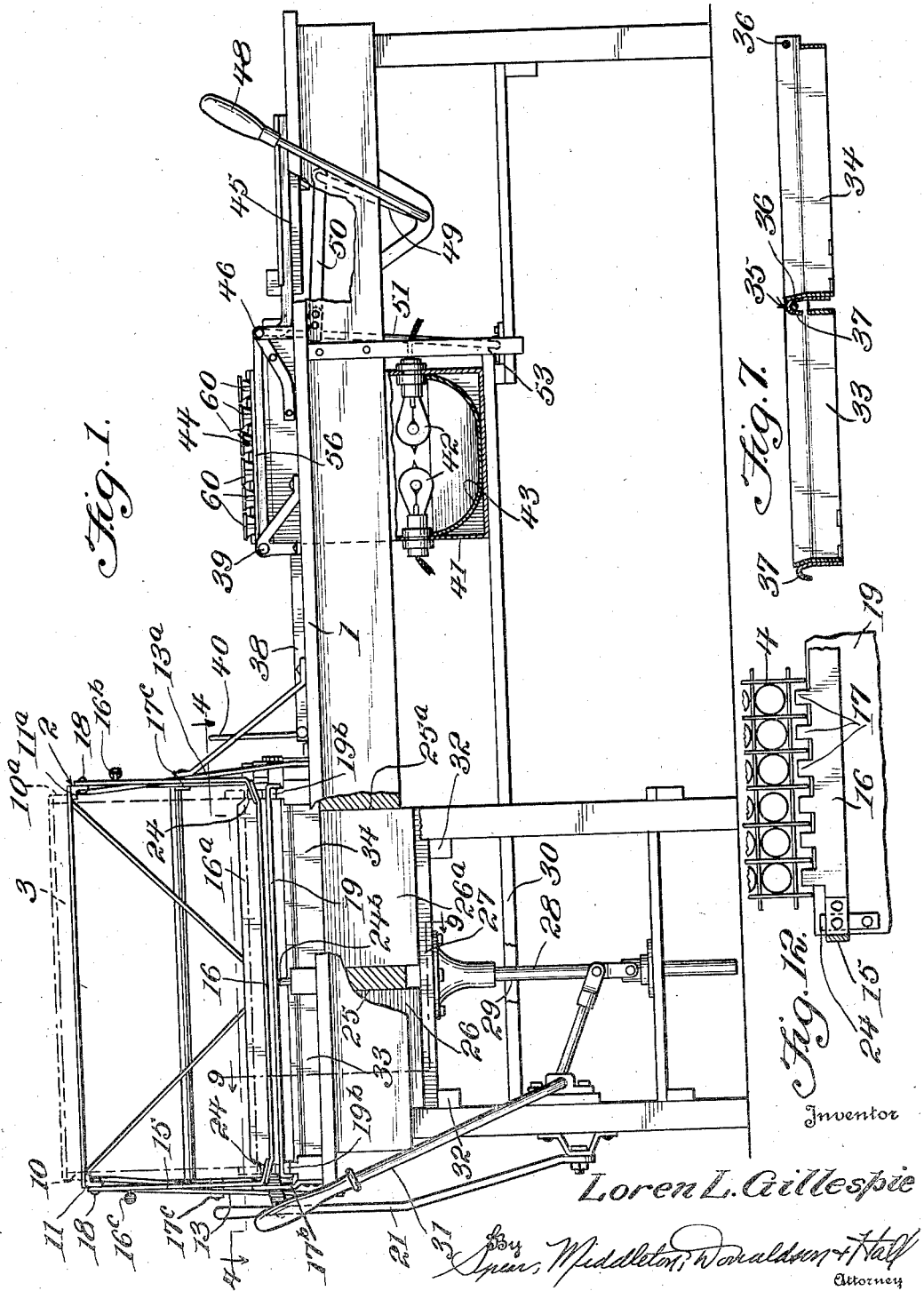

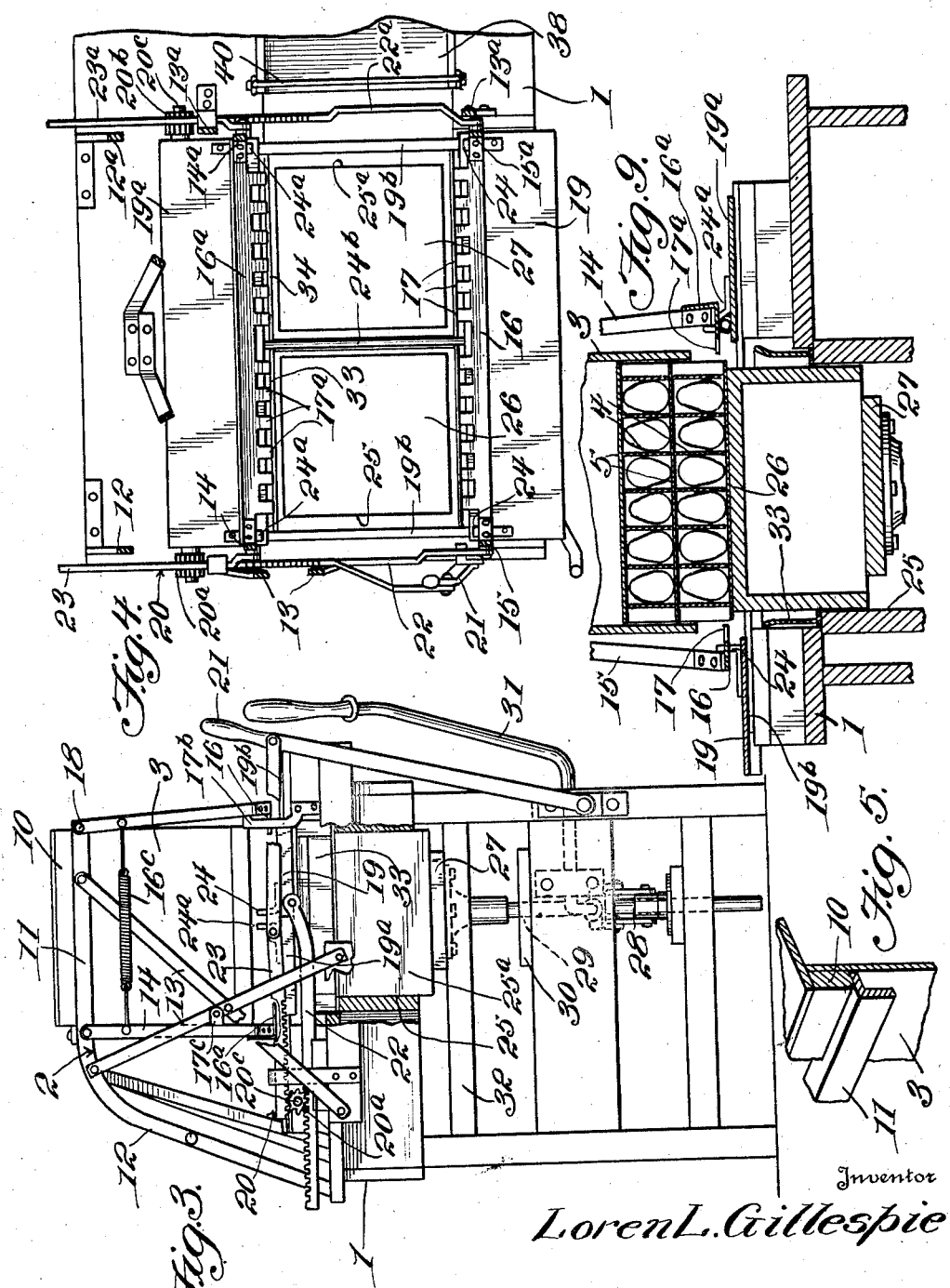

Dec. 31, 1929.   L. L. GILLESPIE   1,741,929
EGG HANDLING APPARATUS
Filed Dec. 29, 1927   5 Sheets-Sheet 4
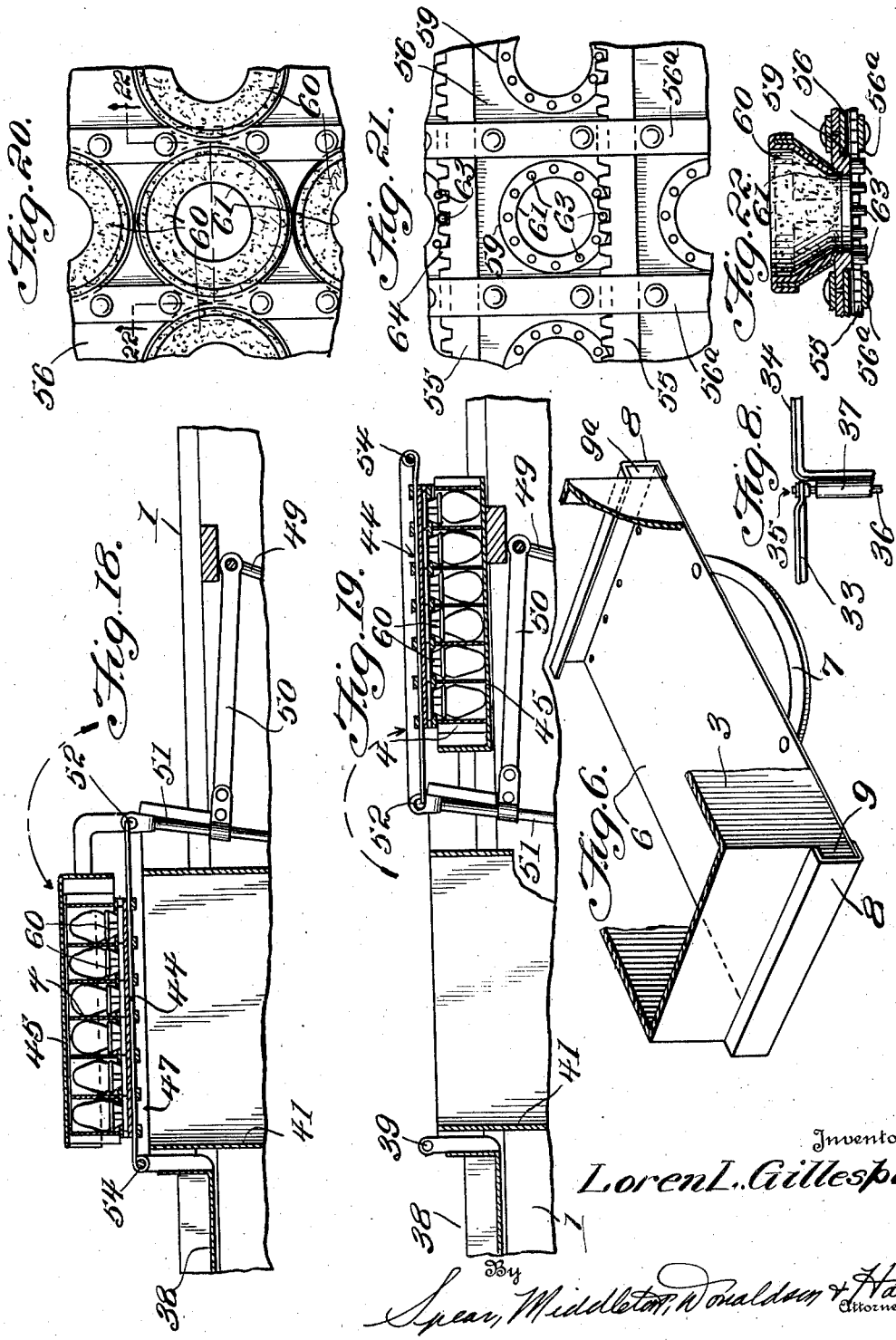
Inventor
Loren L. Gillespie
By Spear, Middleton, Donaldson & Hall
Attorneys Dec. 31, 1929.　　　　L. L. GILLESPIE　　　　1,741,929
EGG HANDLING APPARATUS
Filed Dec. 29, 1927　　　5 Sheets-Sheet 5
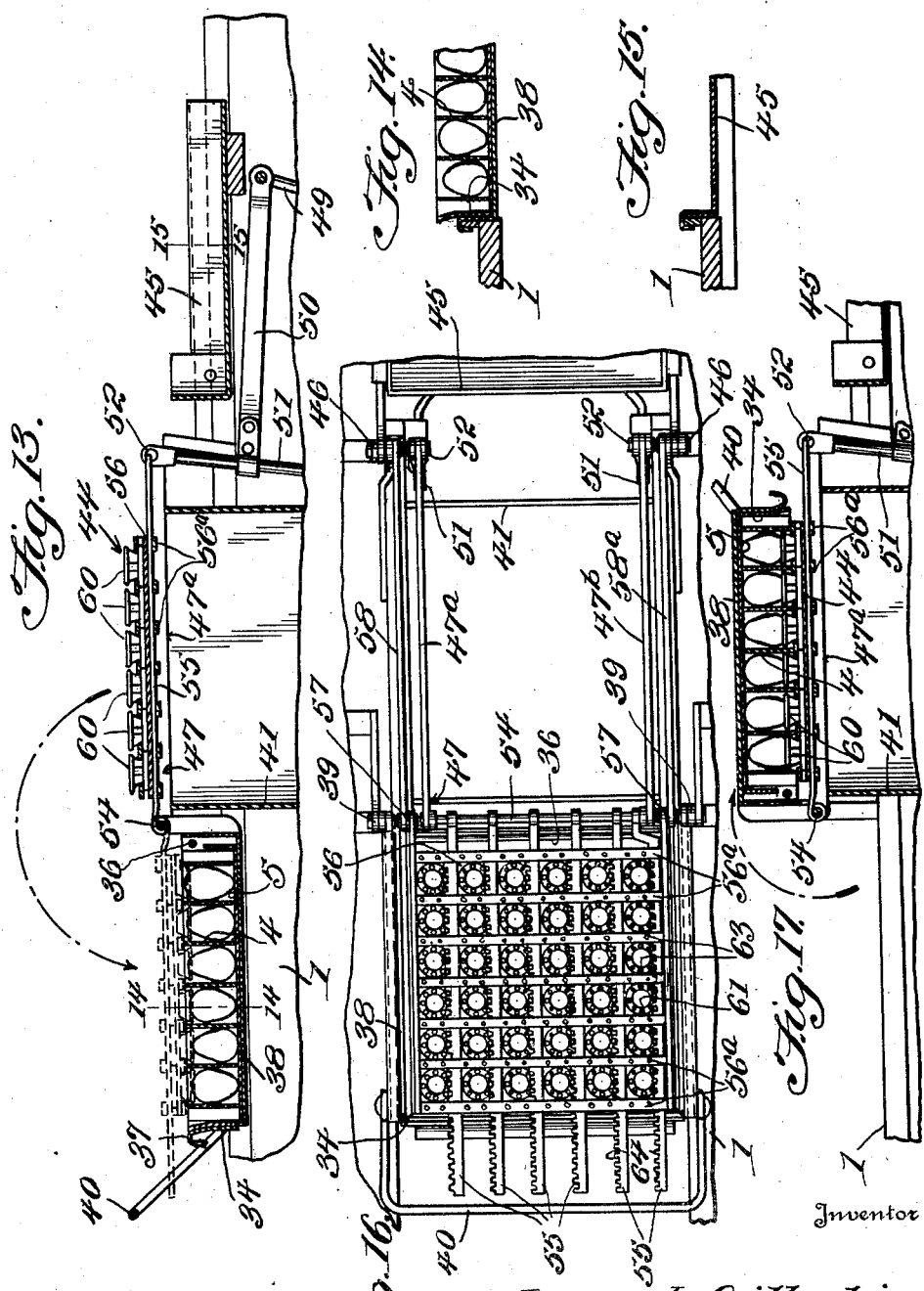
Inventor
Loren L. Gillespie Patented Dec. 31, 1929

1,741,929

UNITED STATES PATENT OFFICE

LOREN L. GILLESPIE, OF HOPKINS, MISSOURI

EGG-HANDLING APPARATUS

Application filed December 29, 1927. Serial No. 243,402.

My invention relates to improvements in egg handling and candling machinery and has for an object the provision of means of durable and simple construction for handling and examining a quantity of eggs at one time.

Another object of the invention is to provide machinery whereby the eggs may be efficiently transferred from the egg crate and examined in filler lots in such a way as to obviate all danger of breakage of the eggs.

A further object is to provide candling means of novel construction, such that the eggs are rotated during examination so that they may be thoroughly and easily inspected on all sides.

Other objects will appear from the accompanying specification and drawings.

The invention consists in the features, combination and arrangement of parts hereinafter described and particularly pointed out in the claims.

In the drawings

Figure 1 is a front elevation of my egg handling device.

Fig. 2 is a plan view of the same.

Fig. 3 is an end view looking from the left in Fig. 1.

Fig 4 is a detail partial plan view similar to Fig. 2 showing the parts in open position.

Fig. 5 is a detail sectional view of the crate with its cleat bearing on the bar 11.

Fig. 6 is a view of the slidable cover in place on the crate.
Fig. 7 is a sectional elevation of the carriers in connected relation.

Fig. 8 is a detail plan view of the carriers in connected relation.

Fig. 9 is a vertical sectional view taken on line 9—9 of Fig. 1 si owing the eggs in fillers in the crate and supported by the raised platforms.

Fig. 10 is a partial sectional elevation similar to Fig. 9 but with the parts in different relative position, showing the toothed plate 16 adjusted to inner position to engage the edge of the flat 5 upon lowering of the platforms to permit the slide plates 19 to slide thereunder to support the eggs above the flat as shown in Fig. 11.

Fig. 12 is a detail view taken on line 12—12 of Fig. 10 showing the relation of the teeth 17 to the egg filler.

Fig. 13 is a partial sectional elevation on line 13—13 of Fig. 2.

Fig. 14 is a partial section on line 14—14 of Fig. 13.

Fig. 15 is a partial section on line 15—15 of Fig. 13.

Fig. 16 is a partial plan view of the parts shown in Fig. 13 but with member 56 swung over into the position shown in dotted lines in Fig. 13.

Fig. 17 is a view similar to Fig. 13 with the tray 38 and its contents as shown in Fig. 16 swung over on top of the light chamber.

Fig. 18 is a view similar to Fig. 17 with tray 38 replaced and tray 45 swung over the egg candling device.

Fig. 19 shows the final position of the eggs in tray 45.

Figs. 20, 21 and 22 are enlarged detail views of the egg candling device. Fig. 22 is a section on line 22—22 of Fig. 20.

Referring to the drawings, 1 represents the table or support for the egg handling and candling machinery. Denoted by the numeral 2 is the frame which is adapted to receive the usual egg crate 3 filled with eggs in fillers 4 separated by flats 5. The open top of the crate 3 is adapted to be covered by a slide cover member or lid 6 having a handle 7, the cover member being turned over at its end edges to form guides 8 for riding on the cleats 9, 9ª of the crate.

The filled crate covered by lid 6 is inverted and is placed in the frame 2 with its cleats 10, 10ª resting upon the upper bars 11, 11ª of the frame.

The frame 2 comprises the upper bars 11, 11ª extending from front to rear of the apparatus and supported by strut members 12, 12ª and 13, 13ª which are connected at their lower ends to the table 1.

Depending pivotally from the bars 11 are pairs of bars 14, 14ª and 15, 15ª. Extending between each of the pairs of bars 14, 14ª and 15, 15ª at their lower ends are toothed edged plates 16 and 16ª, the teeth 17 and 17ª facing each other as shown in Figs. 2 and 4. Extending between the bars 14 and 15 is a spring 16ᶜ and between the bars 14ᵃ and 15ᵃ is a spring 16ᵈ. Stops 17ᵇ and 17ᶜ are provided upon the table 1 and frame 2 to limit the movement of the plates 16 and 16ᵃ toward each other. The plate 16 with its bars 15 and 15ᵃ may be swung about the pivot 18 so as to rest upon the top of the bars 11, 11ᵃ of the frame 2.

Disposed beneath the plates 16 and 16ᵃ are slide plates 19 and 19ᵃ which are slidably mounted upon guides 19ᵇ on table 1 and are operatively connected through a double rack and pinion device 20 with operating lever 21. The pinions 20ᵃ and 20ᵇ are mounted on shaft 20ᶜ rotatably supported in the table 1. The lower rack bars 22, 22ᵃ of the device 20 are connected to plate 19 while the upper rack bars 23, 23ᵃ are connected to plate 19ᵃ. Movement of the lever 21 will cause plates 19 and 19ᵃ to move together or to separate. Plates 19 and 19ᵃ carry upwardly projecting lugs 24 and 24ᵃ at their adjacent edges which operate upon separation of the plates 19 and 19ᵃ to the limit, to move the plates 16 and 16ᵃ further apart. A rod 24ᵇ serves as a central support for the slide plates 19, 19ᵃ.

The table 1 is provided with apertures 25, 25ᵃ in which platforms 26, 26ᵃ are mounted for vertical movement. Platforms 26, 26ᵃ are carried by a support 27 having a stem 28 slidable through an aperture 29 in a guide member 30 and operated upon by a bell crank lever 31. Stops 32 are provided upon the table 1 to limit the downward movement of the support 27.

The platforms may be raised by lever 31 into engagement with the egg case 3 or its lid 6, and when lowered are flush with the table top.

Carrier members 33 and 34 are provided which are adapted to be removably connected at 35, a rod 36 of carrier 33 being engaged by a hooked edge 37 of carrier 34. This connection enables the carrier 33 to be slid along the table by means of carrier 34. The carriers are adapted, as shown in Fig. 4, to be placed over the platforms 26, 26ᵃ so that the platforms can be raised or lowered through them.

A tray 38 is pivotally mounted at 39 to the top of light chamber box 41. This tray is provided with a handle 40 and is adapted to be normally flush with the top of the table 1.

Light chamber box 41, in which are mounted electric light bulbs 42 provided with electric current from any suitable source and through any suitable connections, is mounted in the table 1 adjacent the pivot 39 of tray 38. A reflector 43 is provided in the light chamber for casting the light upwardly.

Beyond the light chamber above which is mounted the egg candling device 44, is another tray 45 also flush with the table which has its pivot 46 at the top of the light chamber.

The egg candling device 44 is adapted to cooperate with trays 38 and 45 to handle a carrier with a filler full of eggs therein and to place them over the light chamber, then to permit examination of the eggs while rotating them, and subsequently to remove them to tray 45. From tray 45 the eggs may be transferred to a refilling device of any suitable construction.

The egg candling device consists of a frame 47 capable of horizontal reciprocation by operation of lever 48 through connections 49, 50, 51 and pivotal connections 52. The frame 47 consists of a pair of bars 47ᵃ and 47ᵇ having pivotal connections with member 51 at 52. Member 51 is a U-shaped bar which bears pivotally on support 53 of table 1. Support 53 also serves to support the light chamber box 41. At their opposite ends the bars 47ᵃ and 47ᵇ of frame 44 are connected by rod 54 to which are pivotally secured rack bars 55 which are guided in part 56 of the egg candling device by straps 56ᵃ. Part 56 of the egg candling device is a perforated sheet of metal preferably and is connected with the light chamber at 57 by means of a pair of links 58, 58ᵃ.

The part 56 is provided with spaced circular apertures 59 adapted to correspond with the spaces in a filler. Rotatably mounted in apertures 59 are eggs supporting cups or rims 60 which have open centers 61 and outwardly and upwardly flaring walls 62. On their under sides the egg cups 60 are provided with spaced teeth or pins 63 which are adapted to be engaged by the teeth 64 of rack bars 55.

It will thus be seen that when the egg candling device is folded with parts 58 and 47 folded over to rest over the upper edge of the light chamber, and part 56 resting over the parts 58 and 47, the lever may be moved to operate the rack bars 55 to turn the egg cups and when the eggs are placed in the cups they will be rotated over the light chamber and may readily be examined by the operator who stands in front of the machine.

In the operation of the apparatus the operator first places the slide lid or cover 6 over the top of the egg case containing the eggs in fillers 4 separated by flats 5. Next the carriers 33 and 34 are hooked together and slid in under frame 2 from the right at tray 38 until they overlie the platforms 26, 26ᵃ. Then toothed plate 16 is swung forward and over on top of the frame 2. The operator then inverts the case with the slide lid 6 covering it and places the case in the frame, handle 7 of the lid toward the front with the cleats 10, 10ᵃ of the case resting upon the bars 11, 11ᵃ. The part 16 is raised to permit the case to be pushed back and then it is rested on the case. Lever 21 is then pushed back as far as it will go, separating the slide plates 19, 19ª and moving toothed plate 16ª back against the action of springs 16ᶜ, 16ᵈ. Lever 31 is then pushed to the left to raise the platforms 26, 26ª against the lid 6 and the slide lid 6 is removed by pulling on handle 7 whereupon the eggs in the lower fillers rest upon the platforms and the eggs in the fillers separated by flats are all carried above them, and the entire column of eggs in fillers may be raised or lowered by manipulating handle 31. Toothed plate 16 is next swung down into position against stop lug 24 on slide 19. Then the platforms are lowered by means of handle 31 until the first flat 5 appears whereupon the lever 21 is operated so that plates 19, 19ª are moved toward each other sufficiently to permit the teeth of the toothed plates 16, 16ª to enter the spaces of the filler (Fig. 10), so that further lowering of the platforms will cause the teeth to support the flat and all above it (Fig. 11). The plates 19, 19ª are then entirely closed together by means of handle 21 and they provide further support for the contents of the egg case (Fig. 11).

The platforms carrying the two fillers of eggs which have been removed from the case are then lowered until flush with the table top one of the fillers being then enclosed within each of the carriers 33 and 34. The carrier 34 is then grasped at its right end and pulled to the right, carrying carrier 33 with it until carrier 34 rests with its filler of eggs within tray 38. Part 56 of the egg candling device is then swung about its pivotal connection with links 58 until it rests over the carrier 34 with the egg cups engaging the eggs. The handle 40 of tray 38 is then grasped and the tray 38 and contents covered by part 56 are swung over on top of the light chamber, whereupon, the tray 38 is swung back to its normal position after having served to transfer the eggs, filler and carrier to the part 56. The filler is removed and lever 48 is pulled back and forth to rotate the eggs during examination over the light chamber. After examination the filler is replaced over the eggs and tray 45 is swung over on top of them, whereupon the member 56 is raised by links 58 about pivot 57 and swung over with eggs, filler, carrier and tray, until tray 45 rests in its normal position flush with the table top. The member 56 with its links 58 are returned to position over the light chamber, leaving the examined eggs in the filler and carrier 34 ready to be transferred to any suitable refilling device. The process is repeated with the eggs in carrier 33 which had been pulled by carrier 34 out until it became accessible. The carrier 34 was disengaged from its hooked engagement with carrier 33 upon lifting of tray 38 with carrier 34 therein.

The carriers 33 and 34, after delivery of the eggs to the refiller, are again hooked together and replaced beneath the egg case to receive two more fillers of eggs. The process is repeated until the case is emptied when it is removed and replaced by a full case of eggs to be tested.

I claim:

1. In egg handling apparatus, a supporting table, an egg case supporting frame mounted on said table, vertically movable platforms beneath said frame and movable through said table to receive and transfer the eggs from the case to the table top, a tray pivotally mounted adjacent said frame and adapted to receive the eggs, a member pivotally mounted adjacent said tray and adapted in one position to overlie said tray and in another position to underlie said tray with the eggs over a light chamber upon swinging the tray and member about their pivots.

2. In egg handling apparatus, a supporting table, an egg case supporting frame mounted on said table, vertically movable platforms beneath said frame and movable through said table to receive and transfer the eggs from the case to the table top, a tray pivotally mounted adjacent said frame and adapted to receive the eggs from beneath said frame, an egg support member pivotally mounted adjacent said tray and adapted in one position to overlie said tray and in another position to underlie said tray and to support the eggs over a light chamber, upon swinging the tray and member about their pivots, and a second tray pivotally mounted adjacent said egg support member on the opposite side thereof from said first mentioned tray and adapted to receive the eggs from said support member upon swinging said second tray and member about their pivots, while placed against each other.

3. In egg handling apparatus, a supporting table, an egg case supporting frame mounted at one end of said table, means for removing eggs from an egg case supported in said frame and for transferring them to the table top filler by filler, carriers beneath said frame for receiving said fillers of eggs, said carriers being slidable on the table, a tray pivotally mounted adjacent said frame and in alignment with said carriers for receiving a carrier, an egg support member, pivotally mounted adjacent said tray and adapted in one position to overlie said tray and carrier, and in another position to underlie said tray and carrier and to support the eggs over a light chamber, upon swinging the tray and member about their pivots.

4. In egg handling apparatus, a supporting table, an egg case supporting frame mounted at one end of said table, means for removing eggs from an egg case supported in said frame and for transferring them to the table top, filler by filler, carriers beneath said frame for receiving said fillers of eggs, said carriers being slidable on the table, a tray pivotally mounted adjacent said frame and in alignment with said carriers for receiving a carrier, an egg support member, pivotally mounted adjacent said tray and adapted in one position to overlie said tray and carrier, and in another position to underlie said tray and carrier and to support the eggs over a light chamber, upon swinging the tray and member about their pivots, and a second tray pivotally mounted adjacent said egg support member on the side opposite to said first mentioned tray and adapted to receive the eggs from said support member upon swinging said second tray and member about their pivots while placed against each other.

5. In egg handling apparatus, a supporting table, an egg case supporting frame mounted on said table, means for transferring eggs in filler lots from said case to said table, a light chamber box in said table, and slidable means and pivotal means associated therewith for transferring eggs from said table beneath said frame to a position above the said light chamber.

6. In egg handling apparatus, a supporting table, an egg case supporting frame mounted on said table, means for transferring eggs in filler lots from said case to said table, a light chamber box in said table, means for transferring eggs from said table beneath said frame to a position above the said light chamber, and means for rotating the eggs while over the light.

7. In egg handling apparatus, a supporting table, an egg case supporting frame mounted on said table, means for transferring eggs in filler lots from said case to said table, carriers on said table beneath the frame for receiving the fillers of eggs, said carriers being slidable on said table, a tray pivotally mounted on said table adjacent said frame and in alignment with said carriers for receiving a carrier, a light chamber box adjacent said tray and means for transferring the carrier with its filler of eggs from said tray to a position above the light chamber.

8. Apparatus according to claim 7 in which means are provided for rotating the eggs in filler lots about vertical axes while over the light chamber by gear racks and pinions.

9. In egg handling apparatus a supporting table, an egg case supporting frame mounted on said table, a slidable cover for said egg case adapted to engage the cleats at the top thereof, said frame having a pair of bars adapted to receive the cleats at the bottom of the case to support the case inverted in the frame in spaced position relative to the table, platforms in said table top mounted for vertical movement between said table top and case, said platforms being adapted to be manually raised and lowered, carriers on said table top through which the platforms are adapted to pass, slidably mounted plates manually movable towards or away from each other beneath said case to form in closed position a support for the contents of the case after removal of the said slidable cover and in open position to permit passage of the platforms therebetween, and a pair of toothed plates pivotally suspended from said frame and spaced apart substantially the width of an egg filler, the teeth of said plates being adapted to extend between the projections on said filler and to support the flat above the filler, said slidably mounted plates when closed also adapted to further support said flat and all the contents of the case above said flat.

10. Apparatus according to claim 9 in which said slidable plates have lugs thereon adapted to engage said toothed plates to further separate the same, and upon slight movement of said slidable plates towards each other from their most open position, to permit the toothed plates to approach each other sufficiently to engage the teeth beneath a flat to support it while permitting the preceding filler of eggs to be carried down on said platform.

11. Apparatus according to claim 9 in which said toothed plates are disposed slightly above said slidable plates and said slidable plates are manually operable by a lever having a double rack and pinion connection with said plates.

12. Apparatus according to claim 7 in which said last mentioned means comprises a flat member pivotally mounted over said light chamber and having egg receiving cups rotatably mounted in apertures therein, said cups being adapted to receive the eggs upon swinging said member over upon said tray containing the carrier with a filler therein, and said cups being adapted to support the eggs upon swinging said tray and member back to normal position of said member over said light chamber, manually operable rack means for rotating said egg cups, said egg cups being provided with peripheral teeth adapted to be engaged by said rack means, said flat member being pivotally mounted so that it may be swung about either end edge thereof, and a second tray pivotally mounted adjacent the side of the light chamber opposite to said first mentioned tray and adapted to cooperate with said member to receive the eggs, filler and carrier therefrom upon swinging said member and second tray about their adjacent pivots.

In testimony whereof, I affix my signature.

LOREN L. GILLESPIE.